United States Patent
Krishnakumar et al.

(10) Patent No.: US 9,218,090 B2
(45) Date of Patent: Dec. 22, 2015

(54) SYSTEM AND METHOD FOR CONTROLLING A PROJECTOR VIA A PASSIVE CONTROL STRIP

(71) Applicant: Dell Products, LP, Round Rock, TX (US)

(72) Inventors: Karthikeyan Krishnakumar, Round Rock, TX (US); Bruce C. Montag, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 325 days.

(21) Appl. No.: 13/856,232

(22) Filed: Apr. 3, 2013

(65) Prior Publication Data
US 2014/0300747 A1    Oct. 9, 2014

(51) Int. Cl.
*H04N 5/33*    (2006.01)
*H04N 9/31*    (2006.01)
*G06F 3/042*   (2006.01)

(52) U.S. Cl.
CPC ...... *G06F 3/0425* (2013.01); *G06F 2203/0339* (2013.01)

(58) Field of Classification Search
USPC .......................................................... 348/164
See application file for complete search history.

(56) References Cited

U.S. PATENT DOCUMENTS

| | | | |
|---|---|---|---|
| 4,670,751 A | 6/1987 | Enokido et al. | |
| 4,711,977 A | 12/1987 | Miyamori et al. | |
| 5,134,388 A | 7/1992 | Murakami et al. | |
| 5,712,658 A * | 1/1998 | Arita et al. | 345/158 |
| 8,194,054 B2 * | 6/2012 | Liu | 345/179 |
| 8,497,841 B1 * | 7/2013 | Sze et al. | 345/168 |
| 2005/0117073 A1 | 6/2005 | Payne et al. | |
| 2007/0188475 A1 | 8/2007 | Tamura | |
| 2008/0100586 A1 * | 5/2008 | Smart | 345/173 |
| 2009/0295723 A1 | 12/2009 | Oakley et al. | |
| 2011/0074739 A1 * | 3/2011 | Kikin-Gil et al. | 345/176 |
| 2011/0169778 A1 * | 7/2011 | Nungester et al. | 345/175 |
| 2012/0013540 A1 * | 1/2012 | Hogan | 345/173 |
| 2012/0176308 A1 * | 7/2012 | Westermann et al. | 345/156 |
| 2012/0182216 A1 * | 7/2012 | Takamatsu et al. | 345/157 |
| 2012/0313910 A1 * | 12/2012 | Haraguchi et al. | 345/207 |
| 2013/0093672 A1 * | 4/2013 | Ichieda | 345/157 |

* cited by examiner

*Primary Examiner* — Jamie Atala
*Assistant Examiner* — Patrick Demosky
(74) *Attorney, Agent, or Firm* — Larson Newman, LLP (57) ABSTRACT

A projector includes an infrared generator, an infrared camera, an infrared control module, and a controller. The infrared generator provides an infrared curtain on a screen that the projector projects an image. The infrared camera detects a selection of an icon on a control strip located within the infrared curtain. The infrared control module is in communication with the infrared generator and the infrared camera, and determines a coordinate position within the infrared curtain associated with the selection of the icon on the control strip. The controller is in communication with the infrared control module, and determines a command for the projector based on the coordinate position of the selection of the icon, and executes the command.

18 Claims, 5 Drawing Sheets

SYSTEM AND METHOD FOR CONTROLLING A PROJECTOR VIA A PASSIVE CONTROL STRIP

FIELD OF THE DISCLOSURE

This disclosure generally relates to information handling systems, and more particularly relates to a system and method for controlling a projector via a passive control strip.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system, such as a projector, can receive control signals to manipulate settings of the projector and how an image is displayed on a projection screen.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
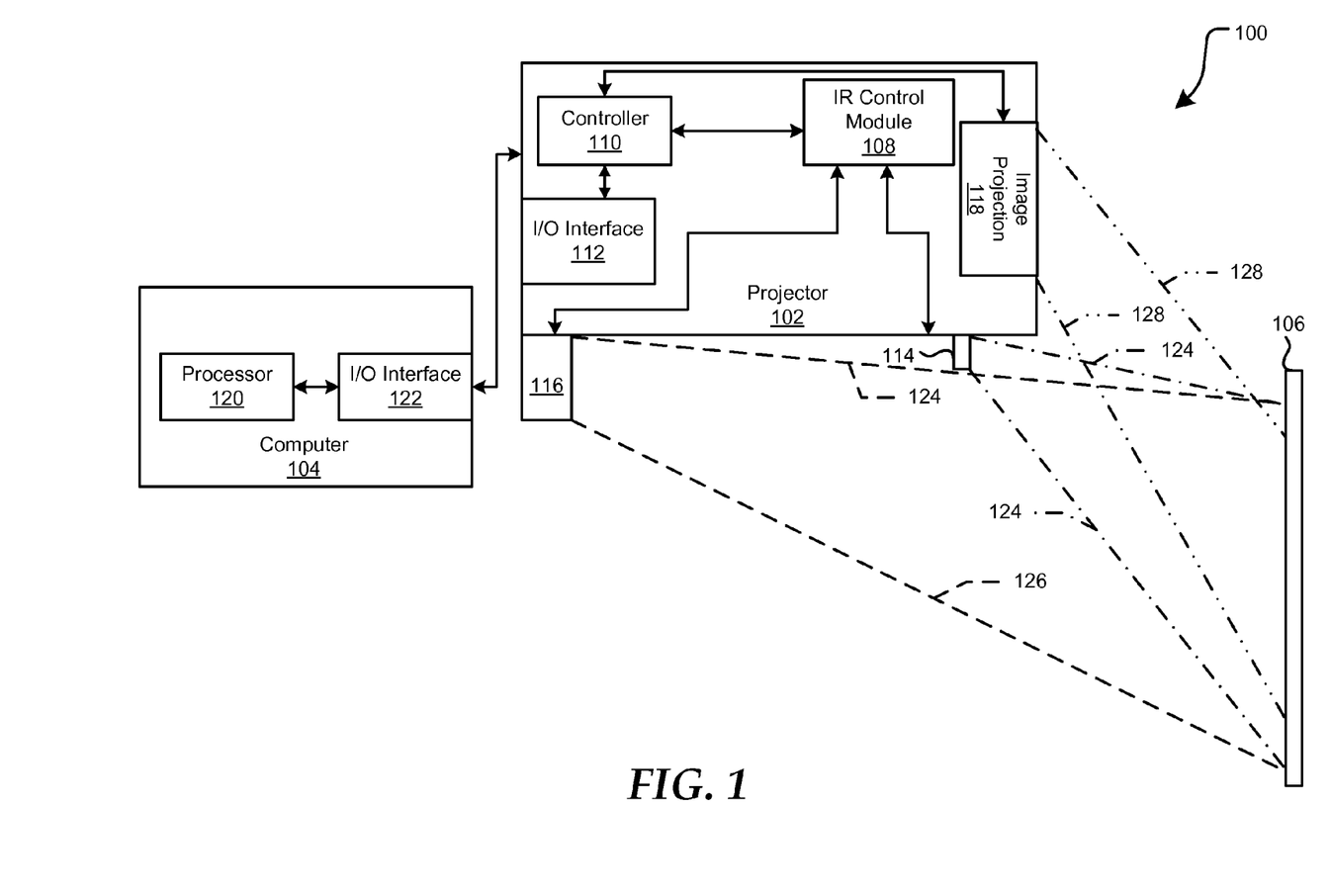
FIGS. 1 and 2 are block diagrams of a projection system.
Figure 2:
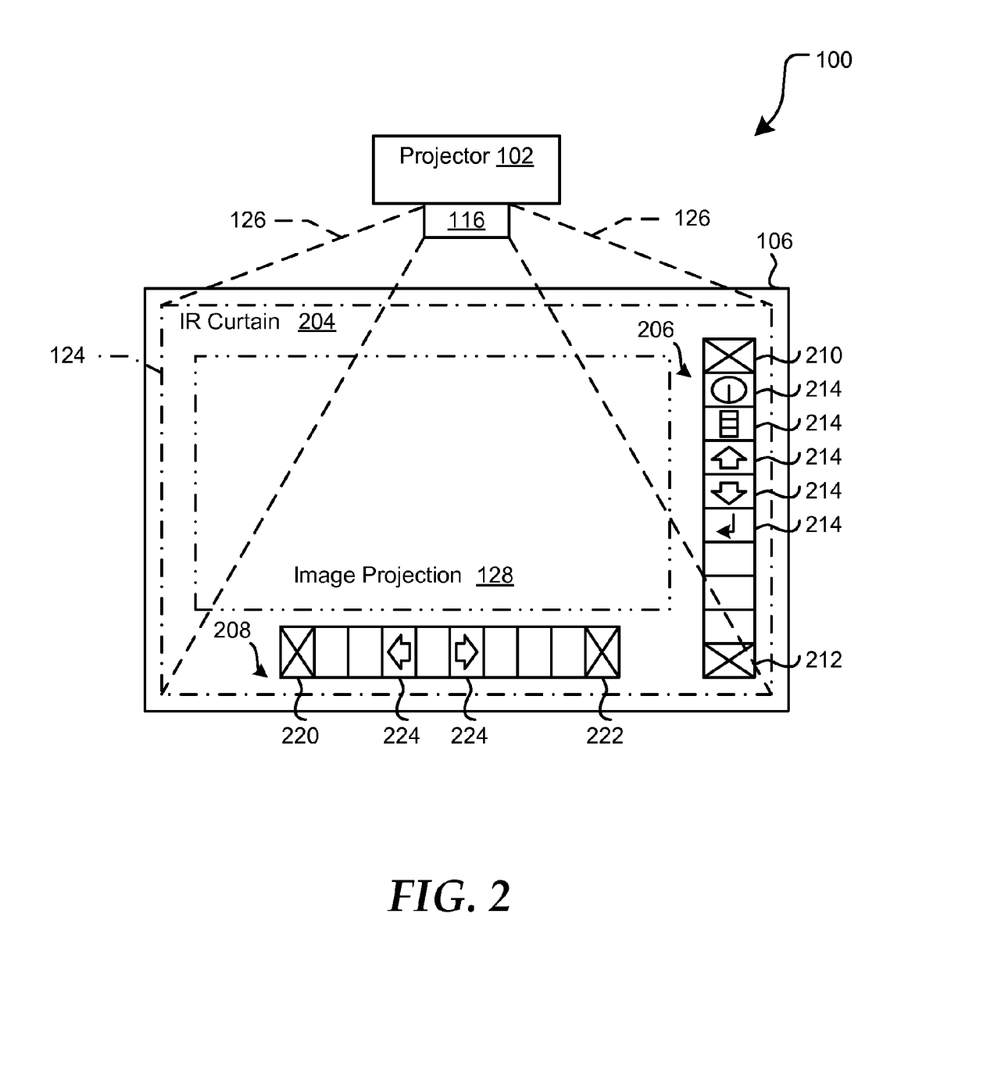

FIGS. 1 and 2 illustrate a projection system 100 including information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The projection system 100 includes a projector 102, a computer 104, and a screen 106. The projector 100 includes an infrared (IR) control module 108, a controller 110, an input/output (I/O) interface 112, an IR generator 114, an IR detector/camera 116, and an image projection module 118. The computer 104 includes a processor 120 and an I/O interface 122. In an embodiment, the IR generator 114 and the IR camera 116 can be built into the projector 102. In another embodiment, the IR generator 114 and the IR camera 116 can be external hardware modules/components connected to the projector 102. The IR control module 108 is in communication with the controller 110, with the IR generator 114, and with the IR camera 116. The controller 110 is in communication with the image projection module 118 and with the I/O interface 112, which in turn is in communication with the I/O interface 122 of the computer 104. The I/O interface 122 is in communication with the processor 120.

The image projection module 118 can project an image having a boundary 128 on the screen 106. The IR generator 114 can project an IR curtain 204 having a projection boundary 124 on the screen 106. The IR curtain 204 can have a specific IR wavelength that can be used as a baseline IR wavelength in the IR camera 116. The IR camera 116 can have a particular field of view 126, and can be configured to detect a specific IR wavelength or wavelengths, such as the IR wavelength of the IR curtain 204.

Control strips 206 and 208 can be attached to the screen 106 within the boundary 124 of the IR curtain 204, but outside of the image projection 128. The control strip 206 can include IR calibration tags 210 and 212 and multiple command/function icons 214. The IR calibration tags 210 and 212 can have different IR wavelengths that can be detected by the IR camera 116. In an embodiment, the IR calibration tags 210 and 212 can each be located at a different end of the control strip 206. The command icons 214 can be images on the control strip 206, such that each icon image has a permanent location between the IR calibration tags. In another embodiment, the projector 102 can display the images for the icons 214 on the control strip 206, such that the order and the images for the icons can be changed. In this embodiment, the IR control module 108 and/or the controller 110 can be preprogrammed with images and locations of the images for the icons 214 of the control strip 206. In an embodiment, the icons 214 in the control strip 206 can be associated commands for the projector 102, such as on/off, menu, up/down, input mode, or the like.

The control strip 208 can include IR calibration tags 220 and 222 and multiple command/function icons 224. In an embodiment, the IR calibration tags 220 and 222 can each be located at a different end of the control strip 208. The IR calibration tags 220 and 222 can have different IR wavelengths that can be detected by the IR camera 116. The command icons 224 can be images on the control strip 208, such that each icon image has a permanent location between the IR calibration tags. In another embodiment, the projector 102 can display the images for the icons 224 on the control strip 208, such that the order and the images for the icons can be changed. In this embodiment, the IR control module 108 and/or the controller 110 can be preprogrammed with images and locations of the images for the icons 224 of the control strip 208, and the images for the icons of the control strip can be displayed separately from the image projection 128 so that changing either the image projection or changing the icons on the control strip does not affect the other. In an embodiment, the icons 224 in the control strip 208 can be associated commands for a program running on the computer 104, such as next page, previous page, mode, or the like.

The IR control module 108 and/or the controller 110 can be preprogrammed to associate the control strips 206 and 208 with different functions/commands. In an embodiment, the IR control module 108 can distinguish between the control strips 206 and 208 based on the IR calibration tags 210 and 212 having different IR wavelengths than the IR calibration tags 220 and 222. Thus, when the control strip 206 is attached to the screen 106, the IR camera 116 can detect the specific IR signatures of the IR calibration tags 210 and 212 within the control strip and can determine the commands/functions associated with the control strip.

The IR control module 108 can also utilize the different IR wavelengths of the IR calibration tags 210 and 212 to determine the orientation of the control strip. The IR control module 108 can be programmed to store an order of the icons 214 between the IR calibration tags 210 and 212. For example, if the IR control module 108 detects that the IR calibration tag 210 is higher than the IR calibration tag 212 in the IR curtain 204, the controller 110 can store that the icons 214 are in a first order from top to bottom. However, if the IR control module 108 detects that the IR calibration tag 212 is higher than the IR calibration tag 210 in the IR curtain 204, the controller 110 can store that the icons 214 are in a second order from top to bottom. In different embodiments, the second order can be opposite than the first order or the second order can be any re-ordering of the icons as compared to the first order. The IR control module 108 and the controller 110 can also be programmed that the icons 214 are located in a straight line between the IR calibration tags 210 and 212, and that each icon covers a specific amount of space in the control strip 206. The IR control module 108 can also convert the locations of the icons 214 within the IR certain 204 to a (X,Y) coordinate, and can send the (X,Y) coordinate and associated command to the controller 110. The controller 110 can then create a look up table associating a particular (X,Y) coordinator with a specific command to be executed by the projector 102.

If the control strip 206 is moved from one location to another within the IR curtain 204, the IR control module 108 can recalibrate the coordinates of the icons 214 within the control strip based on the new locations of the IR calibration tags 220 and 222. The controller 110 can then create a new look up table to associate the new coordinates of the icons 224 with the commands of the control strip 206.

When the control strip 208 is attached to the screen 106, the IR camera 116 can detect the specific IR signatures of the IR calibration tags 220 and 222 within the control strip and can determine the commands/functions associated with the control strip. The IR control module 108 can also utilize the different IR wavelengths between the IR calibration tags 220 and 222 to determine the orientation of the control strip 208.

The IR control module 108 can be programmed to store an order of the icons 224 between the IR calibration tags 220 and 222. For example, if the IR control module 108 detects that the IR calibration tag 220 is further to the left than the IR calibration tag 222 in the IR curtain 204, the controller 110 can store that the icons 224 are in a first order from left to right. However, if the IR control module 108 detects that the IR calibration tag 222 is further to the left than the IR calibration tag 220 in the IR curtain 204, the controller 110 can store that the icons 224 are in a second order from left to right. In different embodiments, the second order can be opposite than the first order or the second order can be any re-ordering of the icons as compared to the first order. The IR control module 108 and the controller 110 can also be programmed that the icons 224 are located in a straight line between the IR calibration tags 220 and 222, and that each icon covers a specific amount of space in the control strip 208. The IR control module 108 can also convert the locations of the icons 224 within the IR certain 204 to a (X,Y) coordinate, and can send the (X,Y) coordinate and associated command to the controller 110. The controller 110 can then send the (X,Y) coordinate and the command to the processor 120 of the projector via I/O interfaces 112 and 122 based on the determination that the control strip 208 is associated with commands for a program being executed in the computer 104. The processor 120 can then create a look up table associating a particular (X,Y) coordinator with a specific command to be executed by the processor within a particular program.

In an embodiment, a user can manually calibrate the location of the control strips 206 or 208. The manual calibration of both the control strips 206 and 208 can be substantially similar. Therefore for simplicity, the manual calibration will only be discussed with respect the control strip 206. In this embodiment, a user can place the control strip 206 on the screen 106. The projector 102, the IR generator 114, and the IR camera 116 can then be turned on, and the IR control module 108 and/or controller 110 can execute a calibration sub-routine. The calibration sub-routine can enable the user to set the specific location of the control strip 206 within the IR curtain 204 and set up the orientation of the icons 214 between the IR calibration tags 210 and 212 in the control strip. The user can also interface with the IR control module 108 and/or the controller 110 to assign a command to each the icons 214 in the control strip 206.

When the manual calibration of the control strip 206 is complete, the control strip should remain in the same location so that the proper commands can be executed when the IR camera 116 identifies a user selection at a particular location within the control strip. For example, if the control strip 206 is adjusted up or down after the user has manually calibrated the location of the control strip, the user can point to a particular icon 214 for a command but the different location of the control strip can cause the IR camera detect a selection of a different icon 214. The IR control module 108 can then send the wrong (X,Y) coordinate to controller 110, which in turn can execute a command other than the command intended by the user. Thus, if the calibration of the control strip 206 is done manually by a user of the projector 102, the manual calibration will need to be repeated every time the control strip is moved so that the controller 110 can execute the command that the user intends to have executed.

In an embodiment, the IR generator 114 and the IR camera 116 can remain turned-on at all times, even when the controller 110 and I/O interface 112 are turned off and the IR control module 108 is in a sleep mode. Thus, the IR camera 116 can detect a selection of an icon 214, such as the on/off icon, or a new control strip being placed within the IR curtain 204 without the other components in the projector 102 operating. The IR camera 116 can then wake-up the IR control module 108, controller 110, and other components in the projector 102 in response to detecting the selection of the icon 214 or detecting the new control strip 206. The IR camera 116 can detect a selection of an icon 214 based on a different IR signature being located in a position where the icon is on the control strip 206. The different IR signature can result from a user placing his or her finger/hand over the icon 214. The user's finger/hand can have a different IR signature than the IR curtain 204, which can trigger the selection of the icon 214.

The IR camera can send the location of the selected icon 214 to the IR control module 108 in response to the IR camera 116 detecting/capturing the selection of an icon. The IR control module 108 can then convert the location of the selected icon 214 to an (X,Y) coordinate within the IR curtain 204, and can provide the (X,Y) coordinate to the controller 110. In an embodiment, the (X,Y) coordinate can be a horizontal distance and a vertical distance from a corner of the IR curtain 204. The controller 110 can then determine whether the coordinate matches a coordinate stored in a look-up table for the control strip 206. If the coordinate matches a stored coordinate, the controller 110 can determine what command is associated with the selected icon 214. The controller 110 can then execute the command associated with the selected icon 214.

If the coordinate corresponds to an icon 224 of the control strip 208, the coordinate may not match a stored in the look-up table because the icon is associated with a command in a program being executed in the computer 104. However, if the coordinate does not match a stored location for the control strip 206, the controller 110 can send the coordinate the processor 120 of the computer 104 via the I/O interfaces 112 and 122. The processor 120 can then determine a command for the coordinate based on a look-up table in the computer 104. If the processor 120 determines an appropriate command for the coordinate received from the controller 110, the processor can execute the command. Thus, the selection of different icons can cause the controller 110 of the projector 102 or the processor 120 of the computer 104 to execute different commands without any interaction with the control strips 206 and 208. Therefore, the control strips 206 and 208 can be passive control strips because they enable the user to invoke different commands in the projector 102 and computer 104 without the control strips actually communicating with the projector and/or computer.

Figure 3:
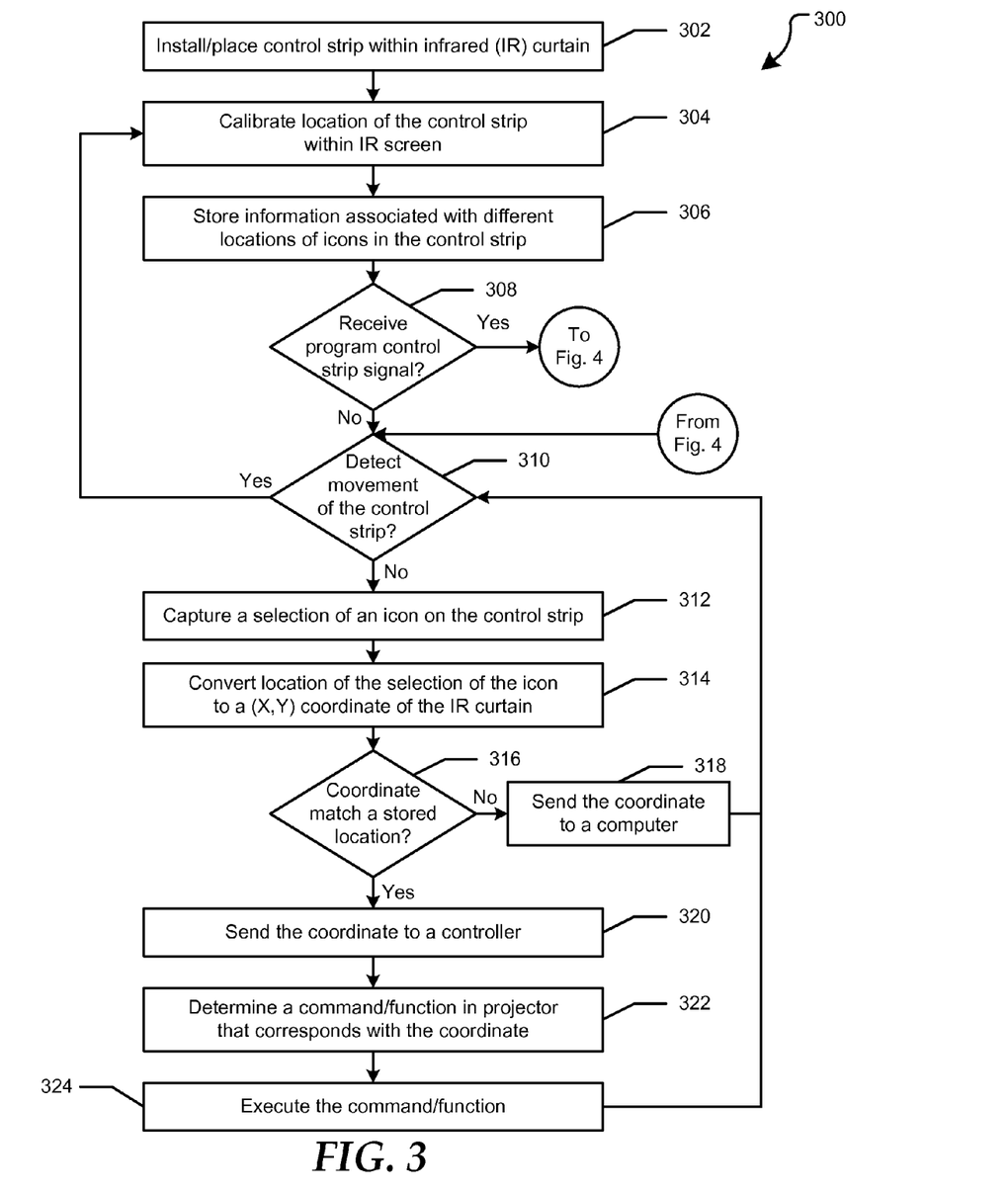
FIG. 3 is a flow diagram of a method for controlling a projector via a passive control strip.

FIG. 3 shows a method 300 for controlling a projector via a passive control strip. At block 302, a control strip is installed/placed within an IR curtain covering an area of a screen used to display an image from a projector. The IR curtain can be set to a specific IR wavelength. A location of the control strip within the IR curtain is calibrated at block 304. In an embodiment, the location of the control strip can be detected by an IR camera of the projector detecting IR calibration tags in the control strip. At block 306, information associated with different locations of icons in the control strip is stored in a look up table. In an embodiment, the information can include associating the different icon locations to particular commands for the projector. At block 308, a determination is made whether a program control strip signal is received. If the program control strip signal is received, the flow continues at block 402 of FIG. 4.

If the program control strip signal is not received or after the new information is stored, a determination is made whether movement of the control strip is detected at block 310. If movement of the control strip is detected, the flow continues as stated above at block 304. If movement of the control strip is not detected, a selection of an icon on the control strip is captured at block 312. At block 314, a location of the selection of the icon is converted to an (X,Y) coordinate of the IR curtain. At block 316, a determination is made whether the coordinate matches a stored location for the control strip.

If the coordinate does not match a stored location for the control strip, the coordinate is sent to a computer at block 318, and the flow continues as stated above at block 310. In an embodiment, when the coordinate does not match a stored location, the coordinate is associated with a location of a command for a program executed on the computer. If the coordinate does match a stored location for the control strip, the coordinate is sent to a controller of the projector at block 320. At block 322, a command/function in the projector corresponding to the coordinate is determined. At block 324, the command/function is executed, and the flow continues as stated above at block 310.

Figure 4:
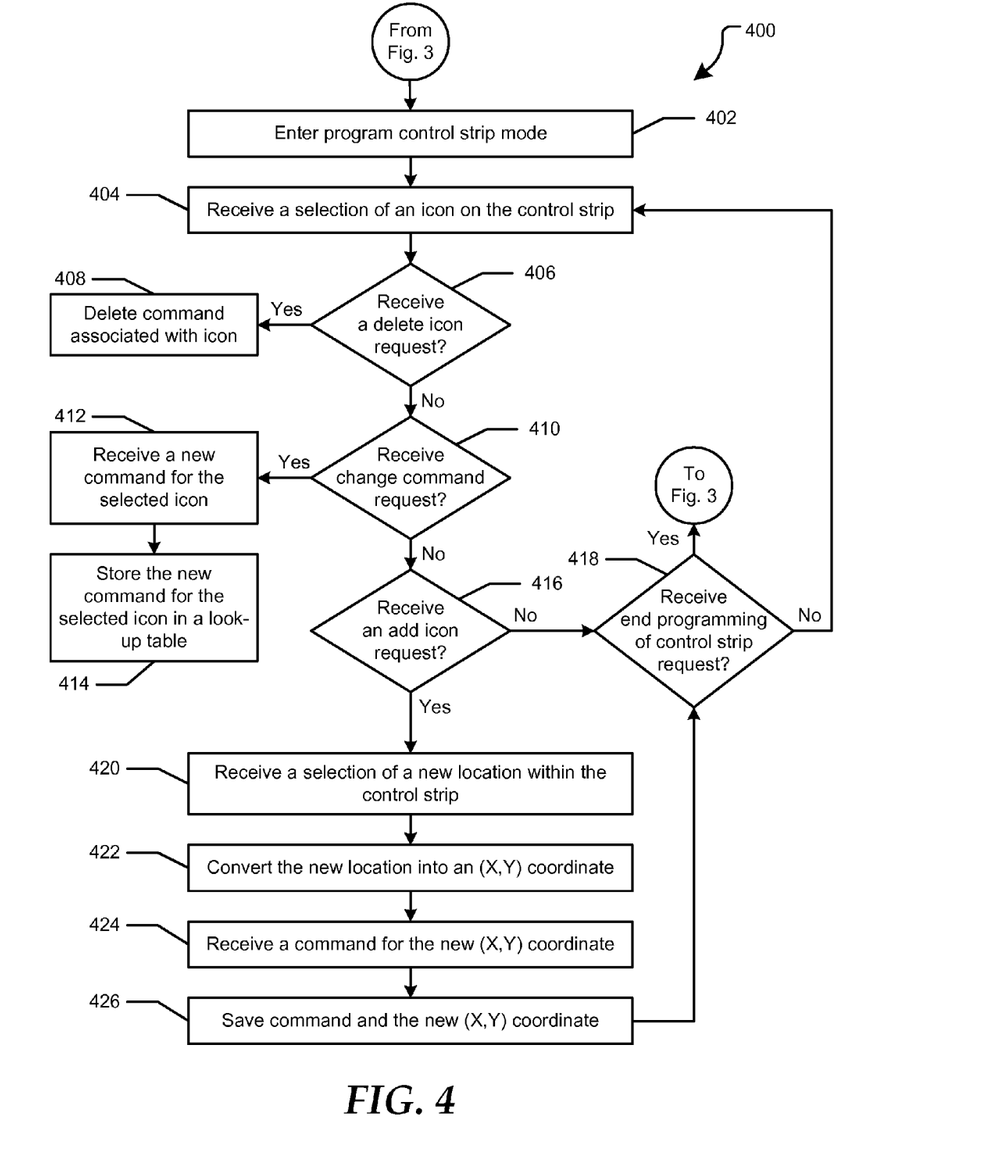
FIG. 4 is a flow diagram of a method for programming commands associated with the passive control strip.

FIG. 4 shows a flow diagram of a method 400 for programming commands associated with the passive control strip. At block 402, a program control strip mode is entered. A selection of an icon on the control strip is received at block 404. At block 406, a determination is made whether a delete icon request is received. This request can be to remove a command associated with the selected icon. In another embodiment, if a projector displays the icons on the control strip the request can be to delete the command associated with the icon, and to stop displaying an image of the icon. If the delete icon request is received, the command associated with the icon is deleted at block 408. If the delete icon request is not received, a determination is made whether a change command request is received at block 410.

If the change command request is received, a new command for the selected icon is received at block 412. At block 414, the new command for the selected icon is stored in a look-up table. In an embodiment, the new command is associated in the look-up table with the (X,Y) coordinate of the selected icon that is already in the look-up table. If the change command request is not received, a determination is made whether an add icon request is received at block 416. If the add icon request is not received, a determination is made whether an end programming of the control strip request is received at block 418. The end programming of the control strip request can be in response to the user selecting a programming icon on the control strip. If the end programming of the control strip request is received, the flow continues at block of 310 of FIG. 3. If the end programming of the control strip request is not received, the flow continues as described above at block 404.

If add icon request is received, a selection of a new location within the control strip is received at block 420. At block 422, the new location is converted into an (X,Y) coordinate. A command for the new (X,Y) coordinate is received at block 424. At block 426, the command and the new (X,Y) coordinate are save in the look-up table, and the flow continues as stated above at block 418.

Figure 5:
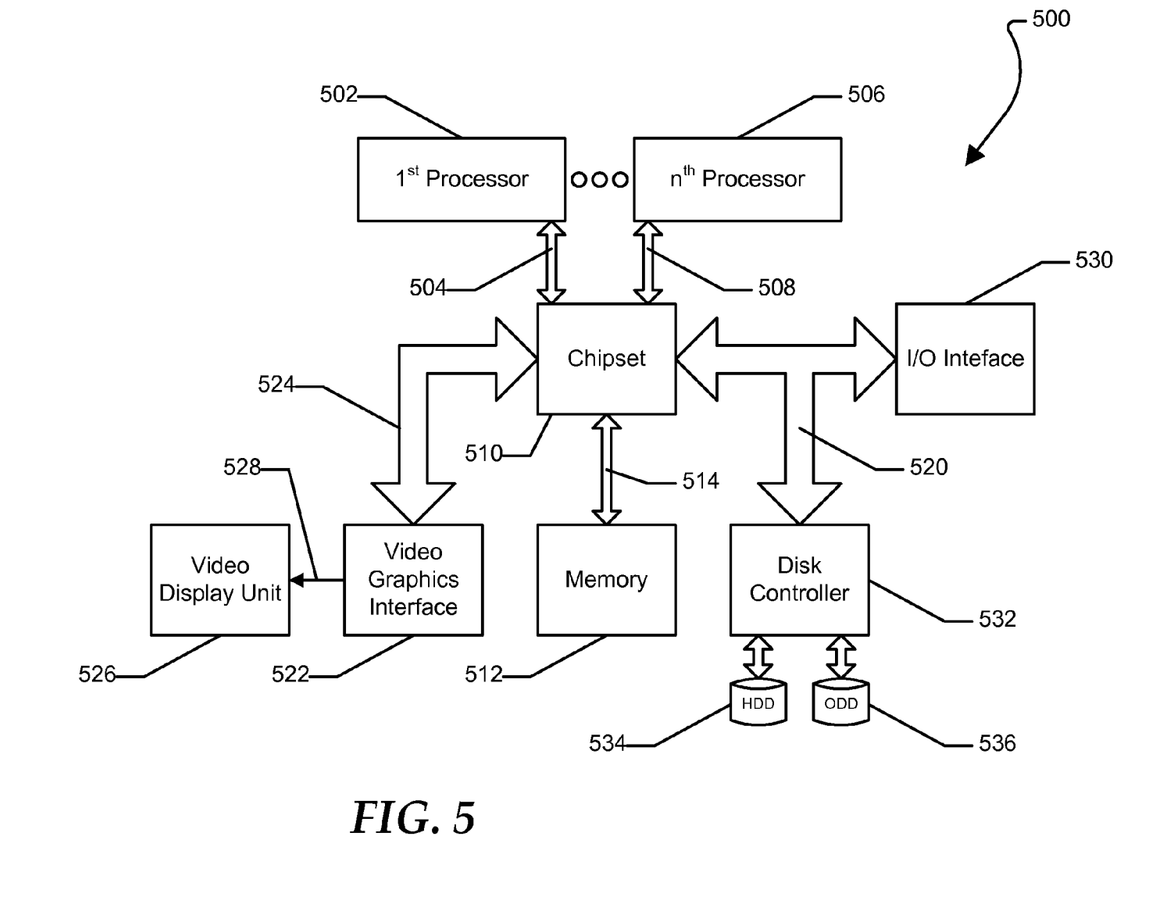
FIG. 5 is a block diagram of a general information handling system.

As shown in FIG. 5, an information handling system 500, such as the projector 102 or the computer 104, can include a first physical processor 502 coupled to a first host bus 504 and can further include additional processors generally designated as n<sup>th</sup> physical processor 506 coupled to a second host bus 508. The first physical processor 502 can be coupled to a chipset 510 via the first host bus 504. Further, the n<sup>th</sup> physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the n<sup>th</sup> physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and n<sup>th</sup> physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the n<sup>th</sup> physical processor 506. The chipset 510 can also include a Southbridge portion (not illustrated) of the chipset 510 and can handle I/O functions of the chipset 510. The Southbridge portion can manage the basic forms of I/O such as Universal Serial Bus (USB), serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 510, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A projector comprising:
   an infrared generator to provide an infrared curtain on a screen that the projector projects an image;
   an infrared camera to detect a selection of an icon on a control strip located within the infrared curtain;
   an infrared control module in communication with the infrared generator and the infrared camera, the infrared control module to determine the location of the control strip based on a first infrared signature of a first infrared calibration tag of the control strip and a second infrared signature of a second infrared calibration tag of the control strip, and to determine a coordinate position within the infrared curtain associated with the selection of the icon on the control strip; and
   a controller in communication with the infrared control module, the controller to determine a command for the projector based on the coordinate position of the selection of the icon, and to execute the command.

2. The projector of claim 1 further comprising:
   an input/output interface in communication with the controller, the controller to send the coordinate position to a computer via the input/output interface in response to the coordinate position not matching coordinate positions stored within a look up table associated with the control strip.

3. The projector of claim 1 wherein commands associated with icons of the control strip are preprogrammed in the controller.

4. The projector of claim 1 wherein the infrared control module further detects a new control strip within the infrared curtain.

5. The projector of claim 4 wherein the control strip has a first infrared signature and the new control strip has a second infrared signature.

6. The projector of claim 1 wherein the infrared curtain has a specific infrared wavelength.

7. A projector comprising:
   an infrared camera to detect a selection of an icon on a control strip located within an infrared curtain;
   an infrared control module in communication with the infrared generator and the infrared camera, the infrared control module to determine the location of the control strip based on a first infrared signature of a first infrared calibration tag of the control strip and a second infrared signature of a second infrared calibration tag of the control strip, and to determine a coordinate position within the infrared curtain associated with the selection of the icon on the control strip; and
   a controller in communication with the infrared control module, the controller to determine a command for the projector based on the coordinate position of the selection of the icon, and to execute the command.

8. The projector of claim 7 wherein commands associated with icons of the control strip are preprogrammed in the controller.

9. The projector of claim 7 wherein the infrared control module further detects a new control strip within the infrared curtain.

10. The projector of claim 7 wherein the control strip has a first infrared signature and the new control strip has a second infrared signature.

11. The projector of claim 7 wherein the infrared curtain has a specific infrared wavelength.

12. A method comprising:
    detecting a control strip attached within an infrared curtain on a screen to display an image from a projector;
    calibrating a location of the control strip within the infrared curtain based on a first infrared signature of a first infrared calibration tag of the control strip and a second infrared signature of a second infrared calibration tag in the control strip;
    detecting a selection of an icon within the control strip;
    converting the location of the selection of the icon into a coordinate within the infrared curtain;
    determining a command for the projector in response to the coordinate matching a coordinate within a look up table; and
    executing the command in the projector.

13. The method of claim 12 further comprising:
    detecting movement of the control strip in response to the first and second infrared signatures of the first and second infrared calibration tags being located in another location in the infrared curtain;
    calibrating a new location of the control strip within the infrared curtain based on the first and second infrared calibration tags in the control strip; and
    storing a new look up table mapping new locations of icons within the control strip to commands of the projector.

14. The method of claim 12 further comprising:
    sending the coordinate to a computer in response to the coordinate not matching a coordinate within a look up table.

15. The method of claim 12 further comprising:
    storing the look up table mapping locations of icons within the control strip to commands of the projector.

16. The method of claim 15 further comprising:
    receiving a program control strip signal;
    removing a command associated with an icon in the control strip from the look up table in response to a delete command request; and
    adding a command associated with the icon in the control strip to the look up table in response to an add command request.

17. The method of claim 12 wherein detecting the control strip comprises:
    detecting a first infrared signature of the first infrared calibration tag and a second infrared signature of the second infrared calibration tag in the control strip.

18. The method of claim 12 further comprising:
    detecting a new control strip in the infrared curtain, wherein the control strip has a first infrared signature and the new control strip has a second infrared signature.

* * * * *